United States Patent [19]
Stocker

[11] Patent Number: 5,536,326
[45] Date of Patent: Jul. 16, 1996

[54] METHOD FOR ENHANCING THE DEWATERING OF STARCH

[75] Inventor: John D. Stocker, Solon, Iowa

[73] Assignee: Betz Laboratories, Inc., Trevose, Pa.

[21] Appl. No.: 529,473

[22] Filed: Sep. 18, 1995

Related U.S. Application Data

[63] Continuation of Ser. No. 296,375, Aug. 25, 1994, abandoned.

[51] Int. Cl.$^6$ .................................................. C08B 30/00
[52] U.S. Cl. ............................ 127/67; 127/65; 127/66; 127/69; 127/70; 127/71
[58] Field of Search ................................. 127/65, 66, 67, 127/69, 70, 71

[56] References Cited

U.S. PATENT DOCUMENTS

| | | | |
|---|---|---|---|
| 4,345,948 | 8/1982 | Breuninger | 127/70 |
| 4,393,202 | 7/1983 | Breuninger | 536/102 |
| 5,104,487 | 4/1992 | Taggart et al. | 162/168.3 |
| 5,229,033 | 7/1993 | Nguyen et al. | 252/358 |
| 5,283,002 | 2/1994 | Nguyen | 252/321 |
| 5,320,777 | 6/1994 | Nguyen et al. | 252/358 |

*Primary Examiner*—Glenn Caldorola
*Assistant Examiner*—Patricia L. Hailey
*Attorney, Agent, or Firm*—Alexander D. Ricci; Richard A. Paikoff

[57] ABSTRACT

A method for enhancing the dewatering of starch comprising adding to an aqueous starch slurry an effective amount of a composition comprising polybutene and at least one surfactant having a melting point less than 20° C.

5 Claims, No Drawings

METHOD FOR ENHANCING THE DEWATERING OF STARCH

This is a continuation of application Ser. No. 08/296,375 filed Aug. 25, 1994, now abandoned.

BACKGROUND OF THE INVENTION

Starch, the principal reserve polysaccharide in plants, constitutes a substantial portion of the human diet. It is the principal component of most seeds, tubers, and roots and is produced commercially from corn, wheat, rice, tapioca, potato, and other sources. Most commercial starch is produced from corn which is comparatively inexpensive and abundant throughout the world. Wheat, tapioca, and potato starch are produced on a smaller scale and at higher prices.

Starch is a mixture of linear (amylose) and branched (amylopectin). polymers of α-D-glucopyranosyl units. Natural starch occurs usually as granules composed of both linear and branched starch molecules. However, some starches are composed only of branched molecules, and these are termed waxy starches because of the vitreous sheen of a cut seed surface. Some mutant seed varieties have been produced with starches having up to 85% linear molecules, although most starches have approximately 25% linear and 75% branched molecules.

The milling of corn provides corn starch, which is extensively used in food and non-food applications. Corn may be dry-milled using screening and air classification of particle size, but this process does not completely separate oil, protein, starch, and hull. Better separation is obtained by wet-milling. (A complete description of the milling process may be found in the Kirk-Othmer Encyclopedia of Chemical Technology, 3rd Edition, Volume 21, pages 492–507, 1983.) In the corn-milling operation, the corn is first cleaned by screening to remove cob, sand, and other foreign material, and then by aspiration to remove the lighter dust and chaff. It is then placed in large vats, called steeps, for the steeping process of softening the kernels for milling. Steeping requires a careful control of water flow, temperature (48°–52° C.), sulfur dioxide concentration (about 0.1%), and a pH at 3-4.

In the wet-milling process, the starch suspension may be processed dry and marketed as unmodified corn starch, modified by chemical or physical means, gelatinized and dried, or hydrolyzed to corn syrup. The wet-milling process requires about 20 gallons of water per 100 pounds of corn; this water must be removed before marketing: It is a goal of the present invention to improve the performance of the means employed in the dewatering process to dewater a starch slurry. In other words, by decreasing the moisture content of starch, the effectiveness of the drying process (the final step in starch manufacture) is improved. The final product may then be employed in various industrial uses.

The effective dewatering of starch is desirable in that a starch with a certain dryness, viscosity, etc. is needed for various industrial uses; by reducing the moisture level in the starch, the amount of potential microbiological growth is reduced. The dewatering is carried out by such means as vacuum filter, plate and frame filter, or by centrifugation.

DETAILED DESCRIPTION OF THE INVENTION

The present invention relates to a process for enhancing the dewatering of starch comprising the addition to a starch slurry of a composition comprising polybutene in combination with at least one surfactant having a melting point or pour point lower than 20° C. This composition can be formulated at room temperature with no heating and cooling required. The surfactants can include but are not limited to polyethylene glycol ester, sorbitan ester, polyoxyalkylene ester or oleic diethanolamide.

The number average molecular weight of the polybutene disclosed in this invention can vary from 300 to 3,000. Even though the efficacy for different molecular weights of polybutene are comparable, a polybutene of molecular weight below 400 is preferred since a translucent and stable solution is formed when combined with nonionic surfactants. Many polyethylene glycol esters are commercially available. Characteristic examples are available from the Mazer Chemical Company as PEG 200 dioleate (DO), PEG 200 ditallate (DT), PEG 400 dioleate (DO), PEG 400 ditallate (DT), PEG 600 dioleate (DO), and PEG 600 ditallate (DT). The sorbitan ester is selected from POE(20) sorbitan trioleate. The polyoxyalkylene ester may be derived from polyoxyalkylene oleic acid which has the following structure:

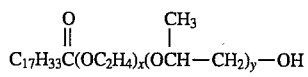

or, polyoxyalkylene dioleic acid which has the following structure:

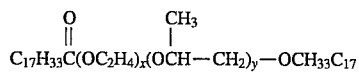

wherein x can be from 1–10 and y can be from 0 to 35 moles,

Block copolymers of ethylene oxide and propylene oxide such as PLURONIC® L81 and PLURONIC® L92 are also useful.

The composition can be made simply by mixing the ingredients (i.e., polybutene, surfactants) thoroughly at ambient temperature. If desired, the mixture can be further diluted to 10% with water. The latter emulsion is stable for up to 3 weeks, the former for about 3 months.

When a polybutene is used with one or more surfactants having a pour point or melting point lower than 20° C. (e.g., PEG 600 DO), the product solidifies or freezes at 10°–20° C. This high freezing point limits the use of this product. However, the addition of 1–15% water blended at room temperature, lowers the freezing point significantly, such as to less than 5° C., probably due to the microemulsion formation or association of water molecules with surfactant molecules. Furthermore, the addition of water does not have a detrimental effect on physical stability.

In order to illustrate the efficacy of the invention for its present purpose, a procedure was carried out in which 100 ml samples of starch slurry that had been fully converted and neutralized were gathered. The composition was added to the slurry in 100 ppm increments, and each sample poured into a buchner funnel. The amount of filtrate produced after five minute intervals was measured.

The composition noticeably increased the filtrate produced, and after several minutes, the gravity drainage ceased. Thus, the method of the present invention increased the amount of filtrate and increased the drainage rate of the sample. The composition tested in this experiment, a preferred embodiment of the present invention, includes the following components: about 40% polybutene; about 50% PEG 600 DO; about 5% PEG 400 DO; remainder water. An amount of the preferred embodiment of from about 150 to 300 parts of the composition per one million parts of the aqueous starch slurry demonstrated the most favorable results. It is expected that treatment amounts of from about 100 to 500 parts of the composition per one million parts of the aqueous starch slurry would be effective.

While this invention has been described with respect to particular embodiments, therefore, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method for enhancing the removal of water from starch which comprises adding to an aqueous starch slurry having present about 20 gallons of water/100 pounds of corn or the equivalent starch thereof, during the wet milling of said starch, a composition comprising polybutene and at least one surfactant having a melting point less than 20° C., wherein from about 100 to 500 parts per million of said composition is added to said aqueous starch slurry.

2. The method as recited in claim 1 wherein said polybutene has a number average molecular weight between about 300 and 3,000.

3. The method as recited in claim 2 wherein said polybutene has a number average molecular weight between about 300 and 400.

4. The method as recited in claim 1 wherein said surfactant is selected from the group consisting of polyethylene glycol dioleate, polyethylene glycol ditallate, sorbitan ester and oleic diethanolamide.

5. The method as recited in claim 1 wherein from about 150 to 300 parts per million of said composition is added to said aqueous starch slurry.

* * * * *